United States Patent [19]

Peterson

[11] 4,226,043
[45] Oct. 7, 1980

[54] INSECT KILLING APPARATUS
[75] Inventor: Dean Peterson, Antioch, Ill.
[73] Assignee: Beatrice Foods Co., Bristol, Wis.
[21] Appl. No.: 8,936
[22] Filed: Feb. 2, 1979
[51] Int. Cl.³ .............................................. A01M 1/04
[52] U.S. Cl. ................................................ 43/112
[58] Field of Search ............................. 43/112, 98
[56] References Cited

U.S. PATENT DOCUMENTS

| | | | |
|---|---|---|---|
| 2,835,071 | 5/1958 | Partridge | 43/112 |
| 3,823,506 | 7/1974 | Iannini | 43/112 |
| 3,835,577 | 9/1974 | Soulos | 43/112 |
| 4,121,371 | 10/1978 | Kaphengst et al. | 43/112 |
| 4,158,268 | 6/1979 | DeYoreo | 43/112 |

FOREIGN PATENT DOCUMENTS 2739896  1/1979  Fed. Rep. of Germany ............ 43/112

Primary Examiner—Nicholas P. Godici
Assistant Examiner—Robert P. Olszewski
Attorney, Agent, or Firm—George J. Netter

[57] ABSTRACT

An electrical apparatus for killing insects has vertically disposed, concentrically arranged mesh electrodes interconnected by suitable switching means to a source of high voltage. The electrodes are supported at their lower ends by individual insulators establishing the lower ends of the electrodes both mutually spaced from each other as well as from the surrounding apparatus enclosure parts. These insulators are located entirely outwardly of the space between the mesh electrodes so that the region below the space between the electrodes is free of obstructions such that electrocuted insects will not be able to collect on the insulators and form an electrical short.

3 Claims, 4 Drawing Figures

INSECT KILLING APPARATUS

The invention relates generally to insect killing apparatus, and, more particularly, to such apparatus for killing insects by electrical means having improved electrical insulation characteristics.

BACKGROUND OF THE INVENTION

Apparatus for electrically killing insects have been known for some time in the prior art as, for example, that disclosed in U.S. Pat. No. 4,121,371 (ELECTRICAL INSECT KILLING APPARATUS) by Elmer Kaphengst et al assigned to the same assignee as this application. The apparatus disclosed in this patent includes a means for attracting insects and electrode means for electrocuting the insects surrounding the attracting means. The electrodes consist of a pair of concentric mesh cylinders arranged vertically and spaced from one another by insulators. Under selective control of a switch, a high electrical potential can be established on the mesh electrodes such that insects passing through the mesh apertures and encountering the electrodes are electrocuted. The mesh spacing is such as to admit insects but prevent entry by small animals, human fingers, and the like. The attactive means include fluorescent tubes emitting wavelengths of light found to be attractive to insects. In operatin of the patented apparatus, it has been found that on occasion the electrocuted remains of the insects falling under the influence of gravity form a bridge between the electrodes and insulator supports resulting in an electrical short.

SUMMARY OF THE INVENTION

In the practice of the present invention, there is provided an electrical apparatus for killing insects having vertically disposed concentrically arranged mesh electrodes which are interconnected by suitable switching means to a source of high voltage. The mesh electrodes are supported at their lower ends by individual insulators establishing the lower ends of the electrodes both mutually spaced from each other as well as from the surrounding apparatus enclosure parts. in addition, the insulators are located entirely outwardly of the space between the mesh electrodes so that the region below the space between the electrodes is completely free of obstructions such that electrocuted insects (normally found between the electrodes) will fall therethrough and not form an electrical short in the region adjacent the electrode supports.

DESCRIPTION OF THE PREFERRED EMBODIMENT

Figure 1:
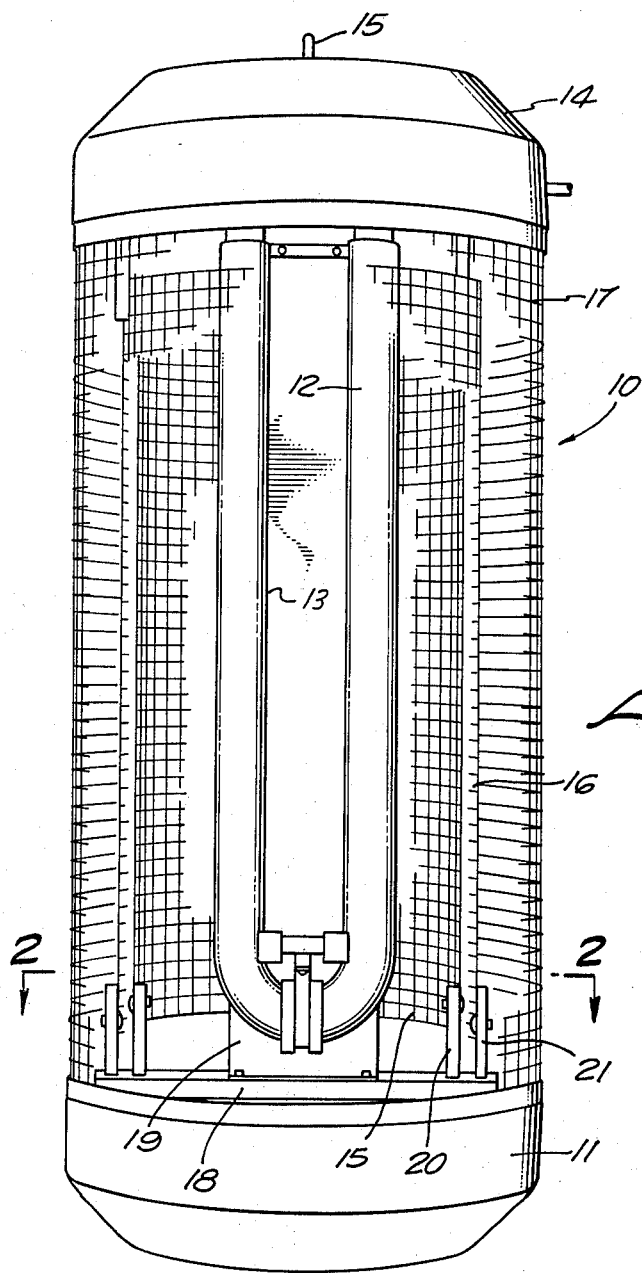
FIG. 1 is a side elevational, partially fragmentary view of the insect killing apparatus of this invention.

With reference now to the drawing and particularly FIG. 1, the bug killing apparatus of this invention is enumerated generally as at 10. In its major parts, the apparatus 10 includesa generally cylindrical base on which is axially mounted a pair of fluroescent tubes 12 and 13 arranged vertically extending, the upper ends of the tubes being receivedin a cover 14. Immediately adjacent and surrounding the tubes 12 and 13 are a pair of concentrically arranged vertically extending electrodes 15 and 16 constructed of wire mesh and which, in a way that will be more particularly described, are electrically interconnected via a transformer within the cover 14 to a source of electrical power for energizing the electrodes to a sufficiently high potential to accomplish the function of killing insects. Surrounding the entire assembly of electrodes and fluorescent bulbs is an outer protective screen 17 completely enclosing the electrodes and fluorescent bulbs and secured at both the upper and lower ends to the cover 14 and the base 11, respectively. The screen prevents inadvertent access by a user as well as small animals and the like to the active parts of the insect killing apparatus.

The base 11 is hollow with its upper surface (not shown) including a plurality of slits or slots via which electrocuted insects can fall in the interior and be temporarily stored for later removal. An elongated, rectangular, hollow metal support 18 is affixed to the upper surface of the base 11 and to which a bracket 19 is mounted for securing the fluorescent tubes 12 and 13 in an upstanding vertical relation.

Figure 2:
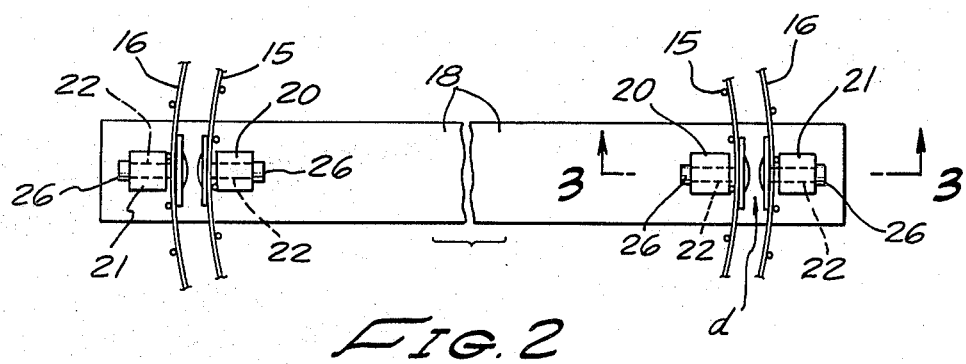
FIG. 2 is a top plan, sectional, partially fragmentary view taken along the line 2—2 of FIG. 1.

The electrodes 15 and 16 are each constructed of wire mesh of a grid spacing suitable to permit average sized insects to pass therethrough. The wire from which the mesh is constructed is sufficiently rigid so that when formed into the desired cylindrical shape of the electrodes, they will maintain their geometrical integrity. The lower ends of each of the mesh electrodes 15 and 16 are affixed to an end portion of an elongated insulator 20 and 21, respectively. In a practical construction of the invention, each electrode is supported by a pair of such insulators located at 180° from each other and at opposite ends of the support 18 (FIGS. 1 and 2). The insulators are so located and constructed as to hold the lower ends of the two electrodes in a spaced relation d (FIG. 3) with the intervening space from the lower edges of the electrodes to the support 18 being free of any obstruction. This feature is primary desideratum of the invention in that as insects fly through the mesh parts of the electrode and are electrocuted on contact with one or both of the electrodes, they will tend to fall downwardly and if an obstruction were to exist between the electrodes the electrocuted insects could form a shorting bridge between the electrodes and/or ground damaging the apparatus making it partially or completely inoperable.

With respect to detailed construction, each insulator 20 and 21 includes an elongated, rectangular block of a ceramic, or other good insulating material, having adjacent one end a pair of transversely extending openings 22 passing completely through the insulator body. The opposite or mounting end 23 of the insulator body is of reduced cross-sectional dimensinos providing a small rectangular end and a channel with shoulder 24 formed thereby. A longitudinally extending opening 25 is formed in the small or reduced end 23.

In assembly, each of the mesh electrodes 15, 16 is provided with a pair of insulators affixed at 180° from one another. That is, the innermost electrode 15 has a pair of insulators 20 secured to the lower, inwardly directed surface of the electrode by a rivet 26 having a large head and a washer, the washer being of sufficient dimensions as to engage and clampingly secure the mesh to the insulator sidewall with the shank of the rivet passing through one of the insulator openings 22. The outer cylindrical electrode 16 similarly has a pair of insulators 21 affixed to the outer surface of the lower edge margin, thereby insuring that the spaced between the electrodes (FIG. 3) is free from any obstruction by the insulators 20 and 21.

Figure 4:
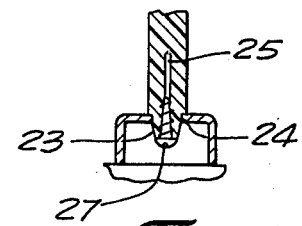
FIG. 4 is a fragmentary sectional view taken along the line 4—4 of FIG. 3.
Figure 3:
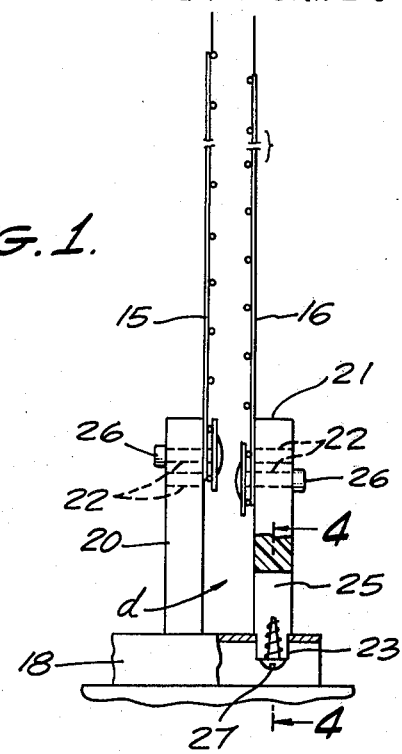
FIG. 3 is a side elevational sectional view taken along the line 3—3 of FIG. 2.

The lower or small ends 23 of the insulators are received into preformed openings in the support 18 as shown best in FIGS. 3 and 4, and member 27 threaded into the openings 25 which expands the insulator ends laterally so that they are frictionally retained within the openings. The shoulder 24 of each of the insulators serves to provide the necessary vertical support for the electrodes. In this manner, the electrodes are maintained in the necessary fixed, laterally spaced relationship, d, with the region thereunder maintained free of obstruction by the insulators, thereby obviating the creation of an electrical shorting condition resulting from dead insects collecting about such obstructios. It is also to be noted that the lateral width of the support 18 is only slightly greater than the insulators 20 and 21 (FIG. 4) which reduces the horizntal surface on which the bodies of the insects can collect insuring that they will be safely deposited in the lower parts of the base 11 for subsequent removal.

In the practice of the presentinvention, an improved insulator support arrangement is provided obviating the possibility of electrocuted insects collecting on the upper surface of the insulators and forming an electrical short. For example, in the aforementioned U.S. patent, a pair of mesh electrodes were secured in upstanding spaced relation by insulators which were located at the lower edge of the electrodes and within the space between the electrodes. That is, in the patented scheme, an insulator was affixed to the facing edge margins of the electrodes and providing a surface on which electrocuted insects could accumulate and, on occasion, form an undesirable electrical short.

The insulators 20 and 21 can be constructed of any suitable material having sufficiently high insulation. For example, in addition to a ceramic material, these insulators may be advantageously constructed of teflon or other synthetic plastic material especially high electrical resistance.

I claim:

1. In an electrical apparatus for killing insects having means for attracting the insects, first vertically extending mesh electrode means surrounding the atrracting means, second vertically extending mesh electrode means in spaced surrounding relationship to said first electrode means, a top and a bottom, the improvement comprising:

a first pair of insulators affixed to the inwardly facing surface of the first electrode means edge margin and the bottom; and a second pair of insulators affixed to the outwardly facing surface of the second electrode means edge margin and the bottom;

said first and second pairs of insulators being located outwardly of the space between the electrode means leaving said space therebetween free of all obstruction by said insulators.

2. Apparatus for killing insects as in claim 1, in which each insulator is an elongated ceramic body having one end portion of reduced cross-section for receipt within a suitably dimensioned opening in a member carried by the bottom, the other insulator end portion having an opening extending transversely therethrough, each insulator being affixed to the mesh electrodes by a rivet extending through the insulator opening and electrode.

3. Apparatus for killing insects as in claim 2, in which a longitudinally extending opening is formed in the reduced cross-sectin end portion and a threaded member is received therein distending the reduced cross-section end portion laterally frictionally retaining the same within the member opening.

* * * * *